United States Patent [19]

Friedman

[11] Patent Number: 5,267,716

[45] Date of Patent: Dec. 7, 1993

[54] MOUNT FOR MAGNIFYING LENS

[76] Inventor: Arthur S. Friedman, 2144 Seneca West, Merrick, N.Y. 11566

[21] Appl. No.: 892,964

[22] Filed: Jun. 3, 1992

[51] Int. Cl.5 .......................................... G02B 25/02
[52] U.S. Cl. ..................................... 248/291; 359/802; 359/815; 359/818
[58] Field of Search ............... 248/291, 214; 224/902; 359/802, 815, 818, 817

[56] References Cited

U.S. PATENT DOCUMENTS

| | | | |
|---|---|---|---|
| 979,550 | 12/1910 | Olian | 248/291 |
| 1,419,321 | 6/1922 | Smith | 248/291 |
| 1,419,322 | 6/1922 | Smith | 248/291 |
| 1,556,510 | 10/1925 | King | 359/803 |
| 1,609,396 | 12/1926 | Blonigen | 248/291 |
| 1,884,968 | 10/1932 | Bloch | 359/803 |
| 1,909,662 | 5/1933 | Conners | 359/803 |
| 2,096,696 | 10/1937 | Land | 359/493 |
| 2,410,171 | 10/1946 | LeLande | 248/291 |
| 2,905,054 | 9/1950 | Logan | 359/818 |
| 3,641,965 | 6/1953 | Valenza | 359/803 |
| 3,955,884 | 5/1976 | Del Pesco, Sr. | 359/818 |
| 4,398,800 | 8/1983 | Hayes | 359/818 |
| 4,540,239 | 9/1985 | Frankel | 359/802 |
| 4,712,870 | 3/1987 | Robinson et al. | 248/286 |
| 4,893,221 | 1/1990 | Friedman | 362/108 |
| 4,940,311 | 7/1990 | Buszek et al. | 359/441 |
| 4,972,979 | 11/1990 | Gordon | 362/109 |
| 5,074,508 | 12/1991 | Powers | 248/291 |

Primary Examiner—Richard K. Seidel
Assistant Examiner—Kenneth E. Peterson
Attorney, Agent, or Firm—Dennison, Meserole, Pollack & Scheiner

[57] ABSTRACT

A mount for magnifying lenses including a U-shaped clip having front and rear panels with the front panel relatively shorter than the rear panel and with the lower edge of the front panel pivoted to the rear leg of an L-shaped bracket. The bracket includes a forward leg extending from the rear leg and terminating in a forward edge having a slot therein opening into an interior pocket adapted to receive a mounting tab of a magnifying lens.

12 Claims, 2 Drawing Sheets

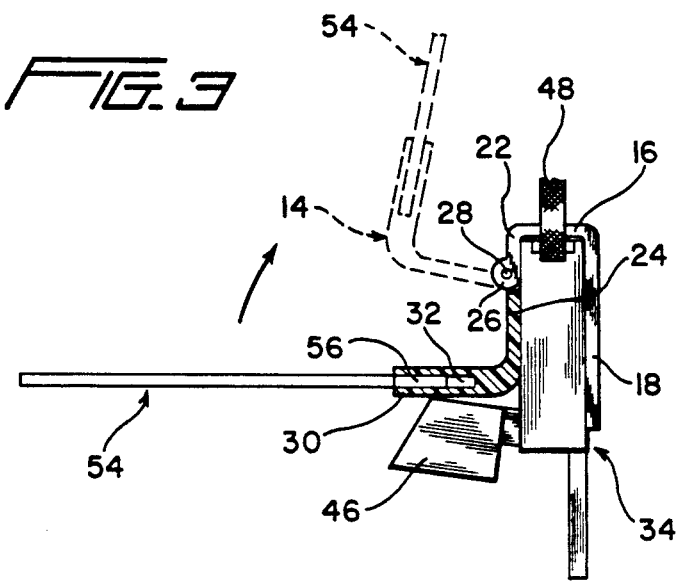
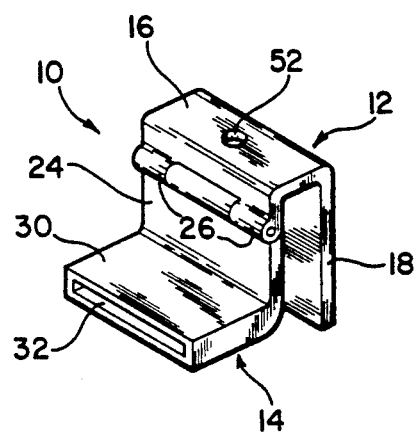
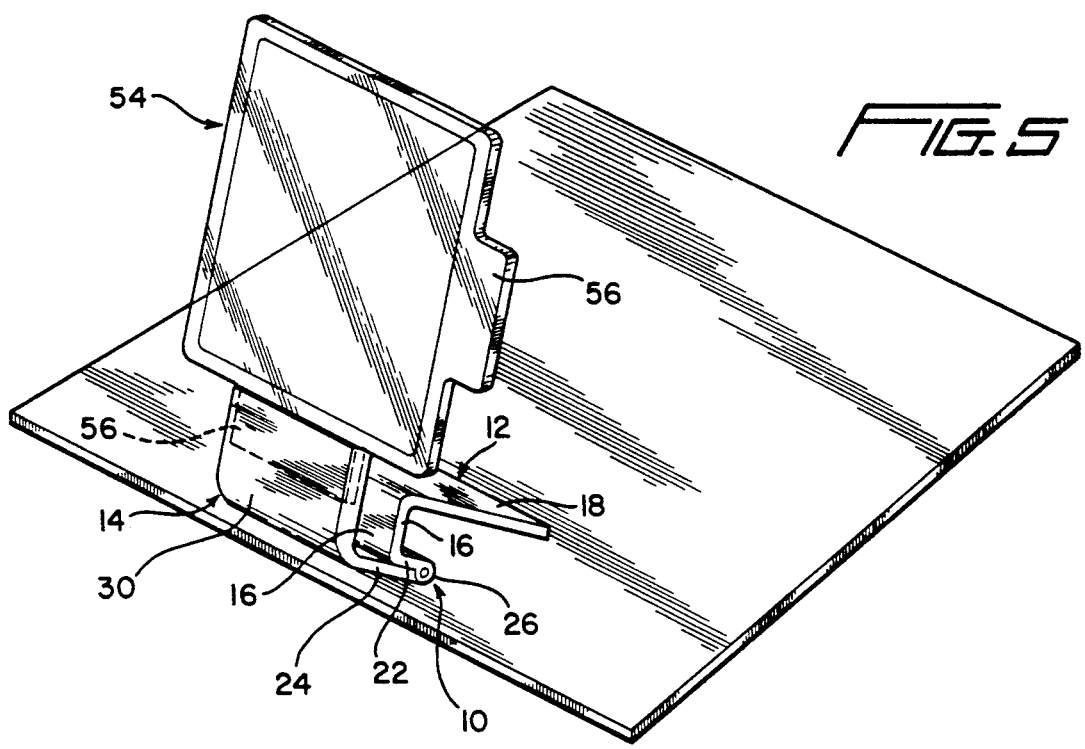
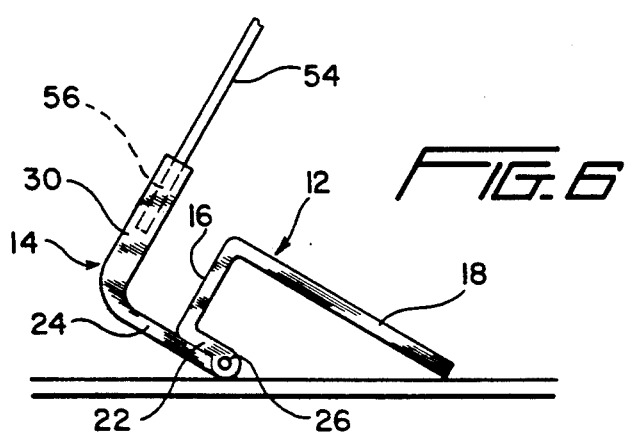

MOUNT FOR MAGNIFYING LENS

BACKGROUND OF THE INVENTION

The invention is broadly concerned with the provision of a mount for the support and positioning of a magnifying lens adjacent a source of artificial light.

The advantages of such a combination are many, including a convenient illumination and enlargement of reading material, and an enhanced visibility of the viewing or work area for any number of purposes including medical examination, handicrafts, and the like.

Examples of known mounts for positioning magnifying lenses relative to a light source will be seen in the following patents:

| | |
|---|---|
| 1,556,510 | King |
| 1,884,968 | Bloch |
| 2,641,965 | Valenza |
| 4,540,239 | Frankel |

The known mounts are each of limited utility, generally being adapted for use with and able to accommodate only the single light fixture with which it is associated, and containing in effect a permanently mounted lens. The known mounts are not, as a practical matter, capable of providing for use of the lens as a self supported device independent of the light fixture.

The inventor's own prior U.S. Pat. No. 4,893,221, Friedman, issued Jan. 9, 1990, discloses a unique portable light utilizing a flat battery case with a pivotally mounted lamp housing thereon. This light, adapted to be suspended about the neck of a user, has been found to be a particularly useful portable light source. It has also become apparent that it would be highly desirable to provide for use of a magnifying lens in association therewith. The known devices, while acceptable for their intended purposes, cannot in any obvious manner associate with the type of portable light shown in the prior Friedman patent, do not provide the desired versatility of accommodating interchangeable lens, and do not allow for the actual mounting and positioning of the lens for use independently of the portable light.

SUMMARY OF THE INVENTION

It is a principal object of the present invention to provide a lens mount which will releasably clip to the flat case of a portable light of the type shown in the Friedman patent in a manner as to position the lens over and behind the actual light source for a clear viewing of the illuminated area.

Another significant object of the invention is to provide a mount which accommodates interchangeable lens, preferably by a frictional retention thereof.

A further object of the invention is to provide a lens mount which, when affixed to a strap-suspended portable light, allows for a pivotal movement of the lens itself between a projecting in use position and a retracted position collapsed against the chest of the user of the light.

An additional and particularly significant object of the invention is to provide a mount which has multiple uses including the capability of acting as a stand, independent of the portable light, for the positioning of a lens on or adjacent a work or reading surface.

The objects of the invention are achieved by providing a mount which comprises two components, a U-shaped clip or support member and an L-shaped bracket. The clip includes a top panel, a depending rear panel and a relatively shorter depending front panel generally parallel to the rear panel.

The L-shaped bracket includes a pair of legs or leg panels at approximately right angles to each other. One of the bracket legs has an outer edge hinge joined to the lower edge of the front panel of the U-shaped clip. The second leg of the L-shaped bracket extends forwardly from the inner edge of the first leg and has a forwardly opening pocket defined therein and accessible through a slot in the free forward edge thereof. This pocket receives and frictionally retains the mounting tab or handle provided along the edge of a flat magnifying lens of the type contemplated for use with the mount of the invention.

When used with a portable light, the clip engages over the rear portion of the battery case with the front and rear panels of the clip respectively overlying the upper and lower panels or faces of the battery case. The lens supporting bracket overlies the upper panel of the battery case immediately above the lamp housing and, through the hinge-joinder, pivotally moves between an in use position wherein the rear leg of the bracket parallels the front panel of the clip and seats against the upper panel of the battery case. In this position, the lens extends generally perpendicularly outward from the portable light. In a second stored position, the lens mounting bracket is upwardly pivoted and in close proximity to the chest of the user.

The mount is also capable of use as an independent stand. When used in this manner, the lens-mounting bracket is pivoted to position the rear or hinge joined leg in direct overlying engagement with the front panel of the U-shaped clip. This positions the forward leg of the bracket, and the lens mounted therein, parallel to and spaced from the top panel of the clip. The mount is positioned on a support surface, for example tabletop, with the free lower edge of the rear panel of the clip and with the hinge assembly engaging the support surface. In light of the shorter front panel of the clip, the mount will be oriented with the lens slightly rearwardly inclined and with the rear panel of the clip acting as a brace. So positioned, the mount forms a completely balanced stand with the lens directed at a comfortable angling for convenient viewing of the work area, whether this be for reading, craft work, the enhanced viewing of stamps, or the like Other objects, features and advantages of the invention will become apparent from the more detailed discussion of the invention following hereinafter.

BRIEF DESCRIPTION OF THE DRAWINGS

FIG. 3 is a side elevational view of the mount on a portable light;

FIG. 4 is a perspective view of the mount;

FIG. 5 is a perspective view of the mount used as a free-standing stand; and

FIG. 6 is a side elevational view of the mount as illustrated in FIG. 5.

DESCRIPTION OF THE PREFERRED EMBODIMENT

Figure 1:
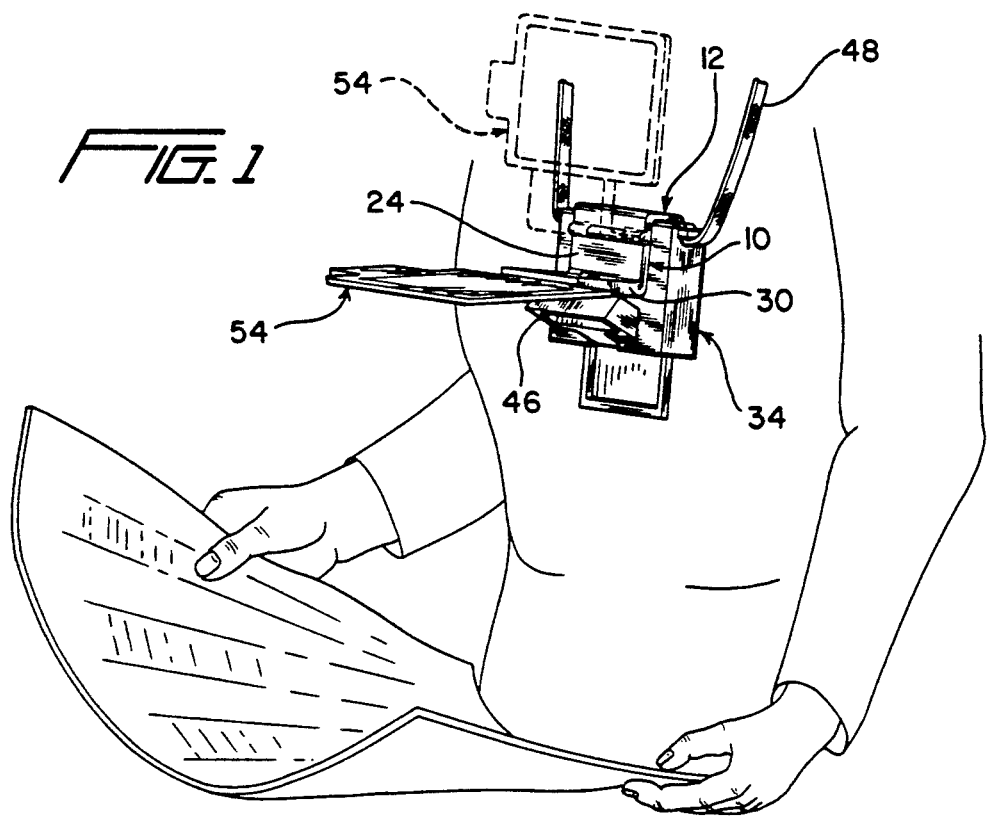
FIG. 1 is a perspective illustration of the mount clipped to a portable light and illustrated both in an in-use position and in a retracted position.

Referring now more specifically to the drawings, the mount 10 includes two components, a mounting clip or support member 12 and a lens-receiving bracket 14.

The clip 12 is a transversely elongate member having a planar first or top panel 16, a second or rear panel 18 integral with the rear edge of the top panel 16 and depending therefrom to a free lower edge 20, and a third or front panel 22 integral with the front edge of the top panel 16 and depending therefrom for a minor distance compared to the height of the rear panel 18.

The bracket 14 is L-shaped and of a transverse width equal to that of the clip 12. Structurally, the bracket 14 includes a panel shaped first or rear leg 24 with an upper edge hinge-joined to the lower edge of the front panel 22 of the clip 12. As illustrated, the hinge-joined edges will have appropriate integral hinge knuckles 26 formed therealong and receiving a hinge pin 28 therethrough.

The lower edge of the rear leg of the bracket 14 is integrally joined to the rear edge of the second or forward panel-shaped leg 30, which projects at approximately right angles to the rear leg 24.

The forward leg 30 is relatively thicker than the rear leg 24 and includes a pocket 32 defined therein between the upper and lower faces thereof. The pocket 32 opens through a slot defined in the forward edge of the forward leg 30.

The mount 10, through the hinge joinder between the clip 12 and bracket 14, has two in-use positions, a first position wherein the rear bracket leg 24 is substantially coplanar with and depends from the front panel 22 of the clip 12, the positioning of the hinge knuckles 26 providing for coplanar rear faces on both the rear leg 24 and front panel 22, and a second in-use position wherein the forward face of the rear leg 24 engages flat against the forward face of the front panel 22 with the hinge joinder comprising a free lower edge One of the principal purposes of the mount 10 is for use with a portable light 34 having a flat battery case 36, the thickness of which is basically only slightly greater than that of the batteries internally received therein. The battery case 36 itself includes a rear wall 38, opposed side walls 40, an upper panel or wall 42 and a lower panel or wall 44. The actual illumination is provided by a lamp housing 46 extending forwardly relative to the battery case 36 and selectively pivoted between a closed position forward of and generally within the plane of the battery case and an open illuminating position upwardly swung to a position angularly extending above the upper panel.

Figure 2:
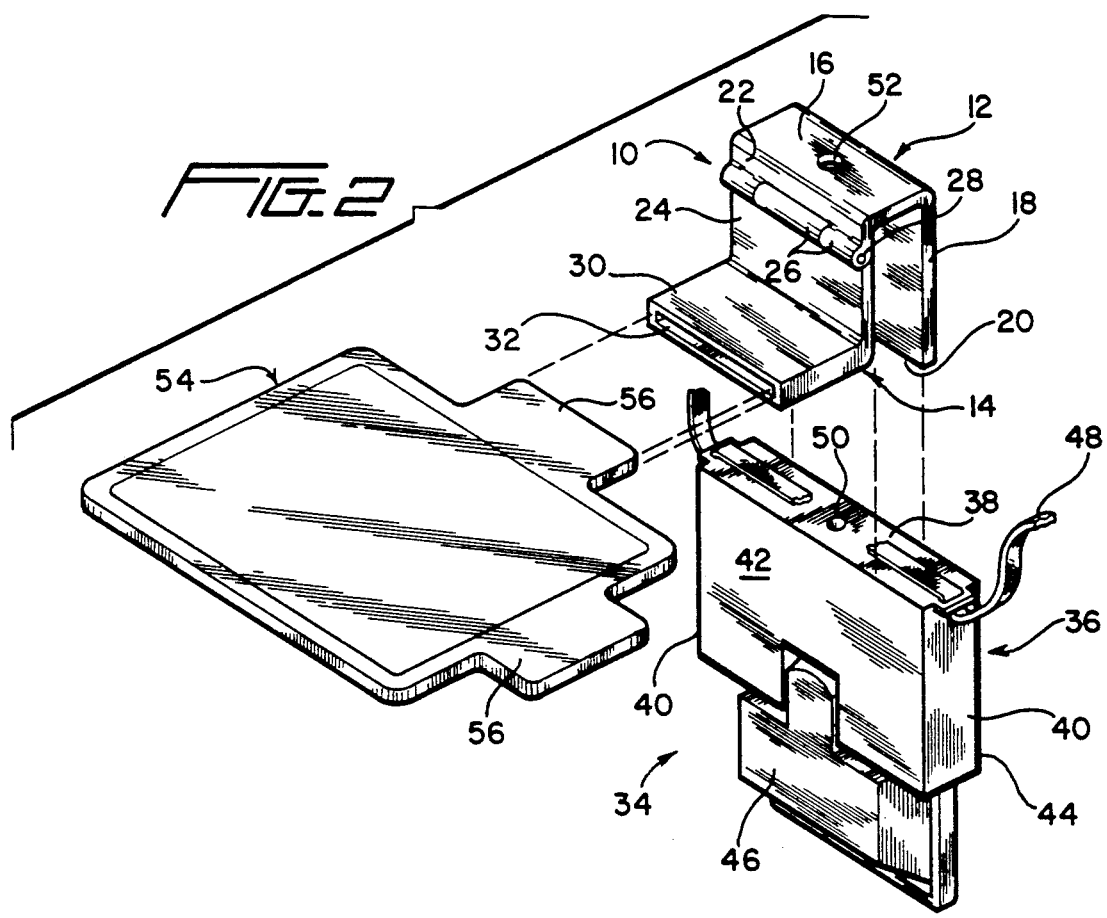
FIG. 2 is an exploded perspective view of the mount, portable light and magnifying lens.

The clip 12 of the mount 10 is positioned over the battery case 36 with the top panel 16 engaging on the rear wall 38 of the battery case 36, either immediately over the suspension strap 48 or thereunder. Noting FIG. 2 in particular, the rear wall 38 of the battery case may include a socket 50 for the reception of a plug in jack from an external source of power. In order to accommodate this socket 50, the top panel 16 of the clip can be provided with a central aperture 52 therethrough.

With the clip 12 mounted to the battery case, the front and rear panels 22 and 18 respectively of the clip will engage the upper and lower walls 42 and 40 of the battery case. This engagement, along with the engaged top panel 16 of the clip, will provide for a stable positioning of the mount 10 on the battery case. Preferably, and through an inherent resilient flexibility of the rigid synthetic resinous material of the mount 10, there will actually be a frictional engaging of the clip 12 to the battery case 36.

The magnifier or planar magnifying lens 54 will, through an edge projection 56 thereon, mount to the bracket portion 14 of the mount 10. The magnifying lens 54 will normally be of a relatively elongate configuration with a mounting projection 56 along both a longitudinal edge thereof and a transverse edge thereof allowing for selectivity in positioning of the lens 54. The mounting projection or tab 56 is slidable received and frictionally retained within the pocket 32 through the open or slotted forward edge of the forward leg 30.

The combined height of the rear leg 24 of the bracket and front panel 22 of the clip 12 are slightly less than the height of the clip rear panel 18 and, when aligned in the in use position as suggested in full lines in FIGS. 1 and 3, position the magnifying lens 54 in overlying relation to the upwardly opened lamp housing 34 and the work or reading area toward which the illumination is directed. So positioned, the L-shaped bracket 14 abuts against the upper panel or wall 42 of the battery case 36 and thus provides for a positive and stable positioning of the magnifying lens 54. It will be appreciated that the positioning of the mount 10 on the battery case is such as to allow for the free pivotal movement of the lamp housing 46 without interference between the lamp housing 46 and the magnifying lens 54.

The hinged joinder between the clip 12 and the bracket 14, again noting FIGS. 1 and 3, allows for an upward swinging of the magnifying lens 54 to a compacted or collapsed position substantially flat against the chest of the user. It will be appreciated that the mount and lens are supported directly from the neck suspended portable light for hands-free use in conjunction with the portable light.

A further particularly significant feature of the invention is the use of the mount 10 as a free-standing support or stand for the lens 54. When used in this manner, noting FIGS. 5 and 6, the L-shaped bracket will be swung about the pivot joinder to a second in use position with the forward face of the rear leg 24 seated against the forward face of the front panel 22 and with the forward leg 30 paralleling the top panel 16 in spaced relation thereto. The mount 10, so folded, is positioned on the workpiece or a supporting surface with the lower edge 20 of the rear panel and the hinged joinder edges, defined by the knuckles 26, engaging the surface. So positioned, the forward leg 30 of the bracket 14 is upwardly and rearwardly inclined. The magnifying lens 54, upon insertion of the appropriate tab or projection 56 within the upwardly directed pocket 32, extends upwardly and angles rearwardly with the mount 10 acting as a support easel and the rear panel 18 as a stabilizing brace. So positioned, the magnifying lens is oriented at a convenient angle for a viewing of the work area therethrough by a person sitting forward thereof. The substantially shorter front panel 22 of the clip 12 provides the desired degree of inclination. Similarly, the rearward inclination of the magnifying lens 54 directs a major component of the weight thereof rearwardly of the forward edge of the stand to retain the mount in this in-use position with the lens stably retained relative to the work surface or area.

From the foregoing, it will be appreciated that a unique mount for magnifying lenses has been defined. The mount, through the provision of particularly cooperating pivotally joined components, is capable of use in two distinct ways, for securing a magnifying lens to a portable light, and for a free standing support of the lens directly at the work area itself.

Important aspects of the invention include the ability to quickly and easily interchange lenses of different powers, and the ability to quickly and easily engage the mount with a portable light by merely a slip engaging of the mount thereon without other mechanical fastening being required. Once mounted on the portable light, the mount includes the ability to be selectively positioned in both a use position and a stored position.

The foregoing is considered illustrative of the features of the invention and not as limitations on the scope of the invention.

I claim:

1. A convertible mount for selective use in mounting a magnifying lens on a case of a portable light and in forming a stand to position a lens in an upright position on a support surface; said mount comprising a support member and a lens bracket, said support member comprising a first panel, laterally spaced second and third panels rigid with and extending from said first panel, said second and third panels terminating in outer edges, said third panels terminating in outer edges, said third panel being substantially longer than said second panel with said outer edge of said third panel being substantially outward beyond said outer edge of said second panel, said lens bracket being of generally L-shaped configuration with first and second legs terminating in outer edges, hinge means connecting said outer edge of said first leg to said outer edge of said second panel, and said second leg including means for releasably mounting a magnifying lens in projecting relation beyond said outer edge of said second leg, said support member being selectively engageable over a case of a portable light with said second panel overlying a surface of the case and with said bracket pivotally adjustable between a first position wherein said first leg generally parallels said second panel with said second leg projecting laterally therefrom and laterally of said surface of the case, and a second position wherein said lens bracket is oriented with said first leg extending generally laterally of said second panel of said support member and with said second leg extending generally parallel to said second panel; said mount being selectively used as a free-standing stand with said outer edges of said second and third panels engageable with a support surface and with said first leg of said bracket immediately overlying and engaging said second panel and extending beyond said first panel, and said second leg generally paralleling said first panel and being upwardly directed relative to the support surface.

2. A mount for a magnifying lens comprising a mounting clip and a lens bracket, said mounting clip, in first and second use positions, having spaced front and rear panels, said front and rear panels having upper portions, means joining said upper portions, said front and rear panels each depending from said jointed upper portions and having a lower edge, said lens bracket having a first leg with an outer edge, hinge means pivotally securing said first leg outer edge to said front panel below said upper portion of said front panel for pivotal movement, and a second leg rigid with said first leg remote from said outer edge and extending therefrom to an outer edge, said second leg including means for mounting a magnifying lens, said lens bracket, through said hinge means, being pivotal between said first use position wherein said first leg generally parallels said front panel of said mounting clip and extends below said lower edge thereof, and said second use position wherein said first leg overlies said front panel and extends above said rear panel, said second leg of said bracket, in said first position, extending forwardly relative to said front panel, and in said second position, extending rearwardly of said front panel, said front panel being of a height less than that of each of said rear panel and said first leg, whereby in said second position said lower edges of said front and rear panels define support edges which, upon engagement with a planar surface, position said mount with said second leg of said bracket upwardly extending relative to the surface.

3. The mount of claim 2 wherein said means for mounting a magnifying lens comprises a pocket in said second leg opening inward through said outer edge thereof for engagement of a portion of a magnifying lens therein.

4. The mount of claim 3 wherein said front and rear panels of said mounting clip parallel each other, and said second leg of said bracket extends at approximately right angles to said first leg.

5. The mount of claim 4 wherein said hinge means pivotally secures said first leg to said lower edge of said front panel.

6. The mount of claim 2 wherein said front and rear panels of said mounting clip parallel each other, and said second leg of said bracket extends at approximately right angles to said first leg.

7. A mount for a magnifying lens comprising a mounting clip and a lens bracket, said mounting clip having a pair of spaced panels, said panels having aligned portions, means joining said aligned portions, said panels each extending from said joined aligned portions and having an outer edge, said lens bracket having a first leg with an outer edge, hinge means pivotally securing said first leg outer edge to one of said panels remote from said aligned portions for pivotal movement of said lens bracket relative to said mounting clip, and a second leg rigid with said first leg remote from said outer edge of said first leg and extending therefrom to an outer edge, said second leg including means for mounting a magnifying lens, said lens bracket, through said hinge means, being pivotal between a first use position wherein said first leg is generally coplanar with said one of said panels of said mounting clip and extends beyond said outer edge of said one of said panels, and a second use position wherein said first leg overlies said one of said panels and extends beyond said aligned portions, said second leg of said bracket, in said first use position, extending generally laterally relative to said one of said panels, and in said second use position, extending in a generally opposite direction.

8. The mount of claim 7 wherein said one of said panels is of a height less than that of each of the other one of said panels and said first leg, whereby in said second use position said outer edges of said pair of panels define support edges which, upon engagement with a horizontal surface, position said mount with said second leg of said bracket upwardly extending relative to said surface.

9. The mount of claim 8 wherein said means for mounting a magnifying lens comprises a pocket in said second leg opening inward through said outer edge thereof for engagement of a portion of a magnifying lens therein.

10. The mount of claim 9 wherein said pair of panels of said mounting clip parallel each other, and said second leg of said bracket extends at approximately right angles to said first leg.

11. The mount of claim 10 wherein said hinge means pivotally secures said first leg to said outer edge of said one of said panels.

12. The mount of claim 8 wherein said pair of panels of said mounting clip parallel each other, and said second leg of said bracket extends at approximately right angles to said first leg.

* * * * *